United States Patent [19]

Siu

[11] Patent Number: 5,094,975
[45] Date of Patent: Mar. 10, 1992

[54] METHOD OF MAKING MICROSCOPIC MULTIPROBES

[75] Inventor: Bryon B. Siu, 2201 Monroe St., #207, Santa Clara, Calif. 95050

[73] Assignees: Research Development Corporation, Tokyo, Japan; Byron Bong Siu, Santa Clara, Calif.

[21] Appl. No.: 352,573

[22] Filed: May 16, 1989

[30] Foreign Application Priority Data

May 17, 1988 [JP] Japan .............................. 63-118240

[51] Int. Cl.5 ............................................ H01L 21/20
[52] U.S. Cl. ........................................ 437/89; 437/90; 437/186; 437/195; 313/309
[58] Field of Search .................. 437/195, 89, 90, 186; 313/309

[56] References Cited

U.S. PATENT DOCUMENTS

| | | | |
|---|---|---|---|
| 3,855,690 | 12/1974 | Kim | 437/89 |
| 3,960,619 | 6/1976 | Seiter | 437/82 |
| 4,513,308 | 4/1985 | Greene et al. | |
| 4,698,316 | 10/1987 | Corboy | 437/89 |
| 4,721,885 | 1/1988 | Brodie | |

FOREIGN PATENT DOCUMENTS

| | | | |
|---|---|---|---|
| 0276960 | 8/1988 | European Pat. Off. | 437/89 |
| 3225398 | 1/1983 | Fed. Rep. of Germany | 437/89 |
| 0044725 | 2/1988 | Japan | 437/89 |

OTHER PUBLICATIONS

C. A. Spindt et al., "Physical Properties of Thin-Film Field Emission Cathodes with Molybdenum Cones", J. of Applied Physics, vol. 47, No. 12, Dec. 76, pp. 5248-5263.

J. B. Warren, "Control of Silicon Field Emitter Shape with Isotropically Etched Oxide Masks", Inst. Phys. Conf. Ser. No. 99, Section 2, Bath, 1989, pp. 37-40.

Primary Examiner—Brian E. Hearn
Assistant Examiner—Laura M. Holtzman
Attorney, Agent, or Firm—Darby & Darby

[57] ABSTRACT

A thin, electrically insulating film is formed on a crystalline substrate and a multiplicity of holes are densely formed in the film. Conductive crystals are epitaxially grown on the substrate exposed in the holes, thereby forming on said substrate densely populated probes having sharp apices.

5 Claims, 4 Drawing Sheets

METHOD OF MAKING MICROSCOPIC MULTIPROBES

FIELD OF THE INVENTION

This invention relates to a method of making a microscopic multiprobe consisting of a multiplicity of densely populated microscopic probes having sharp apices.

BACKGROUND OF THE INVENTION

A microscopic probe having a sharp apex may be utilized in such cases as measuring of 2-dimensional behaviors of conductive particles on a conductive substrate or to draw lines having a width of less than 0.1 μm by means of tunneling current or field emission current.

Such microscopic probe having sharp apex has been conventionally fabricated through mechanical abrasion or electrolytic abrasion.

In the case of mechanical abrasion, a metallic wire cut to a desired length is ground by means of a grinder and the like for mechanical polishing.

In the case of electrolytic abrasion, the tip of a tungsten wire 1 having diameter of about 0.5 mm is first dipped in a dilute potassium hydroxide (KOH) solution 2 as shown in FIG. 1. A DC voltage derived from a DC power supply 4 is then applied across the tungsten wire 1 and an electrode 3, which will have the surface of the tungsten wire 1 in the solution 2 abraded. Since abrasions proceeds much faster near the surface of the solution, the portion of the tungsten wire 1 in contact with the surface of the still solution is abraded to a spindle shape and eventually cut. By quickly turning off the electricity at the moment of the cut of the wire, which can be known from a sudden change in current, a microscopic tungsten probe having a sharp apex can be obtained.

However, such conventional methods as mentioned above can fabricate probes one at a time and they cannot provide densely populated microscopic probes. The reason for this is that conventional mechanical polishing is limited in precision and the electrolytic abrasion has a limitation due to surface tension of the electrolytic solution. Therefore it is not only extremely difficult with these methods to fabricate a microscopic probe but also impossible to fabricate densely populated microscopic probes.

Conventionally, therefore, a single microscopic probe has to be mechanically moved over a substrate surface for scanning measurement or has to draw the same pattern repeatedly, which extremely impairs the efficiency of the work.

BRIEF SUMMARY OF THE INVENTION

The invention is directed to solve the above mentioned drawbacks. A major object of the invention is to provide a method for forming a microscopic multiprobe comprising densely populated probes having sharp apices.

Another object of the invention is to provide a method for connecting electric wires with such densely formed microscopic probes.

The method of the invention for making a microscopic multiprobe is characterized in that a thin film having a multiplicity of densely populated holes is formed on a crystalline substrate and an electrically conductive material is epitaxially grown on the crystalline substrate exposed at the bottom of the holes.

By epitaxially growing such conductive material on the crystalline substrate through the holes in the thin film, crystalline tips are formed in respective holes by faceting each having sharp apices, resulting in the formation of densely populated microscopic probes.

Contact holes that reach said microscopic probes are then formed on the backside of the crystalline substrate, into which a metal material is implanted for interconnecting the microscopic probes with the electric conductors to be deposited therein later. The conductors are insulated from the rest and extended therefrom to external terminals, thereby conveniently providing electric connections for each of the microscopic probes.

DETAILED DESCRIPTION OF THE PREFERRED EMBODIMENT

Figure 1:
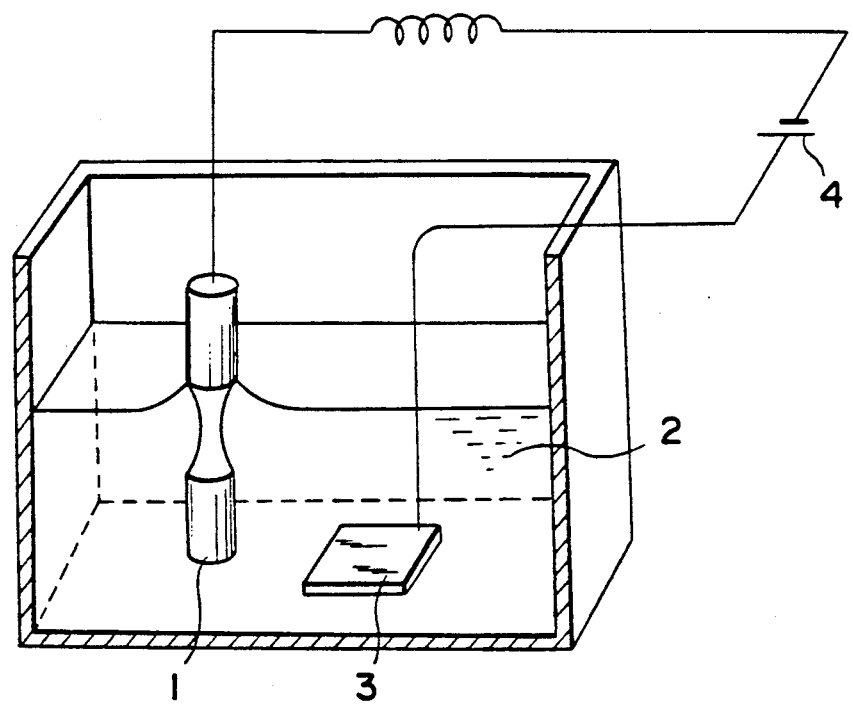
FIG. 1 is an illustration showing a conventional method for making a microscopic probe by electrolytic abrasion.
Figure 2A:
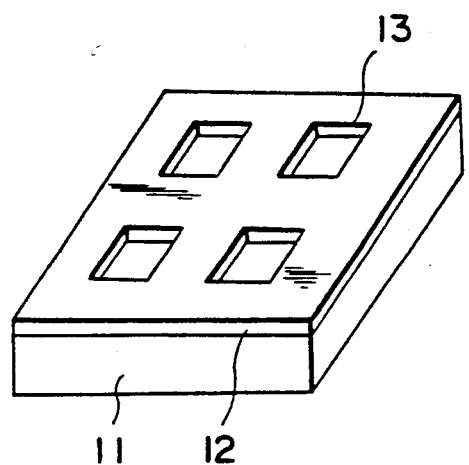
FIGS. 2A through D are illustrations showing the method of making a microscopic multiprobe according to the invention, in which: FIG. A is a perspective view of a substrate before the formation of the microscopic probes; FIG. B, its cross section; FIG. C, a perspective view of the substrate after the formation of the microscopic probes; FIG. D, its cross section.
Figure 2B:
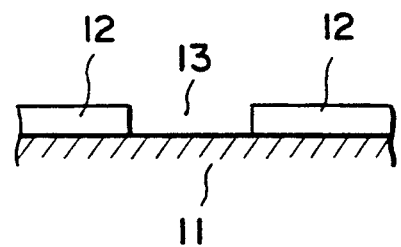
Figure 2C:
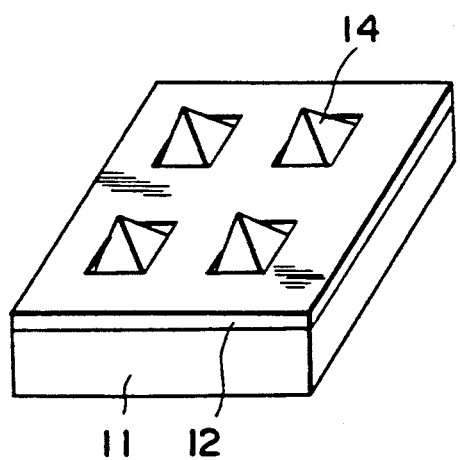
Figure 2D:
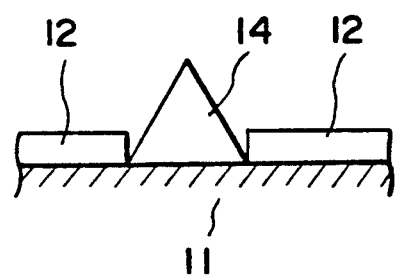

As shown in the perspective view FIG. 2A and cross sectional view FIG. 2B, a silicon oxide film 12 having thickness of about 1 μm is grown on the surface of a silicon substrate 11, in which a multiplicity (four in the FIGURES) of square holes 13 are formed with high density by means of ordinary lithography. The silicon crystal is then epitaxially grown selectively on the portions of the substrate 11 exposed in the holes by providing thereinto four gases $SiH_2Cl_2$, HCl, $H_2$, $B_2H_6$.

This results in epitaxial growth of pyramidal silicon crystals having sharp apices, forming microscopic probes 14 as shown in the perspective view C and the cross sectional view D. In this case borons (B) are doped naturally in the crystals to make the microscopic probes 14 P type.

It has been a well known experimental fact that in such selective epitaxial growth of silicon, facets are formed. For example, four facets will be formed in the four square holes as shown in FIG. 2A. (See J. O. Borland and C. Drowley, Solid State Technology, 1985, Vol. 28, No. 8, pp 141-148)

Generally speaking, however, such facet formation is not favored in the past and much effort has been paid for preventing facet formation.

By contrast facet formation is positively utilized in this invention in forming densely populated, sharp edged pyramidal microscopic probes.

A method is now described for providing electric connections to the dense microscopic probes thus formed on the insulating silicon substrate 11.

Figure 3:
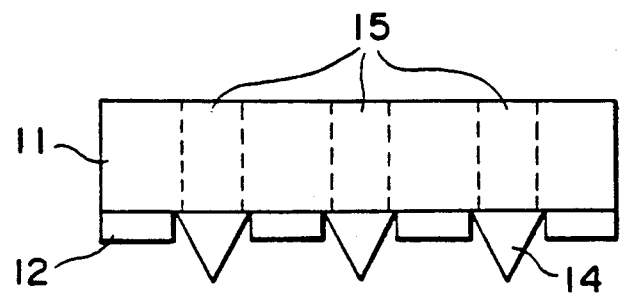
FIGS. 3A through C are illustrations showing a process of providing each of the microscopic probes of a microscopic multiprobe shown in FIG. 2 with electric connections.
Figure 3:
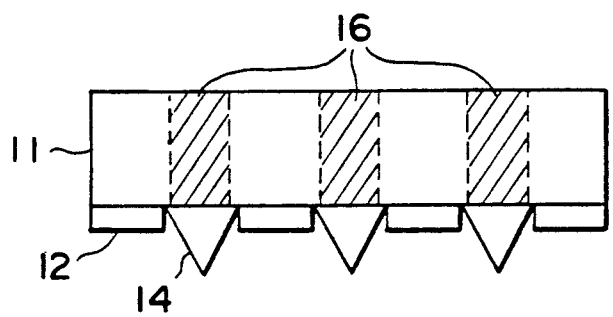
Figure 3:
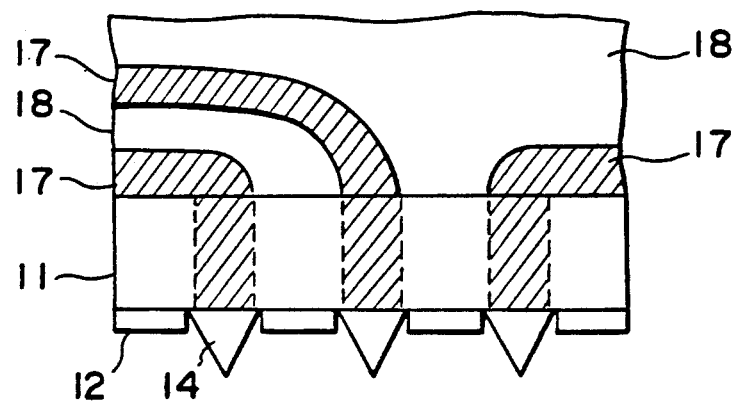

As shown in FIG. 3A the substrate having the above microscopic probes 14 is turned over to form on the backside of the substrate contact holes 15 reaching respective microscopic probes 14 by means of ordinary lithography. In order to align these contact holes 15 with their corresponding microscopic probes 14, a few through-holes are formed at several positions of the silicon substrate 11, and the positions of the microscopic probes 14 are estimated with reference to the through-holes.

Next, aluminum 16 are implanted in the contact holes 15 as shown in FIG. B, and multilayers of aluminum leads 17 and silicon oxide films 18 are further formed thereon as shown in FIG. C. Electric terminals are connected with the aluminum leads 17.

Figure 4:
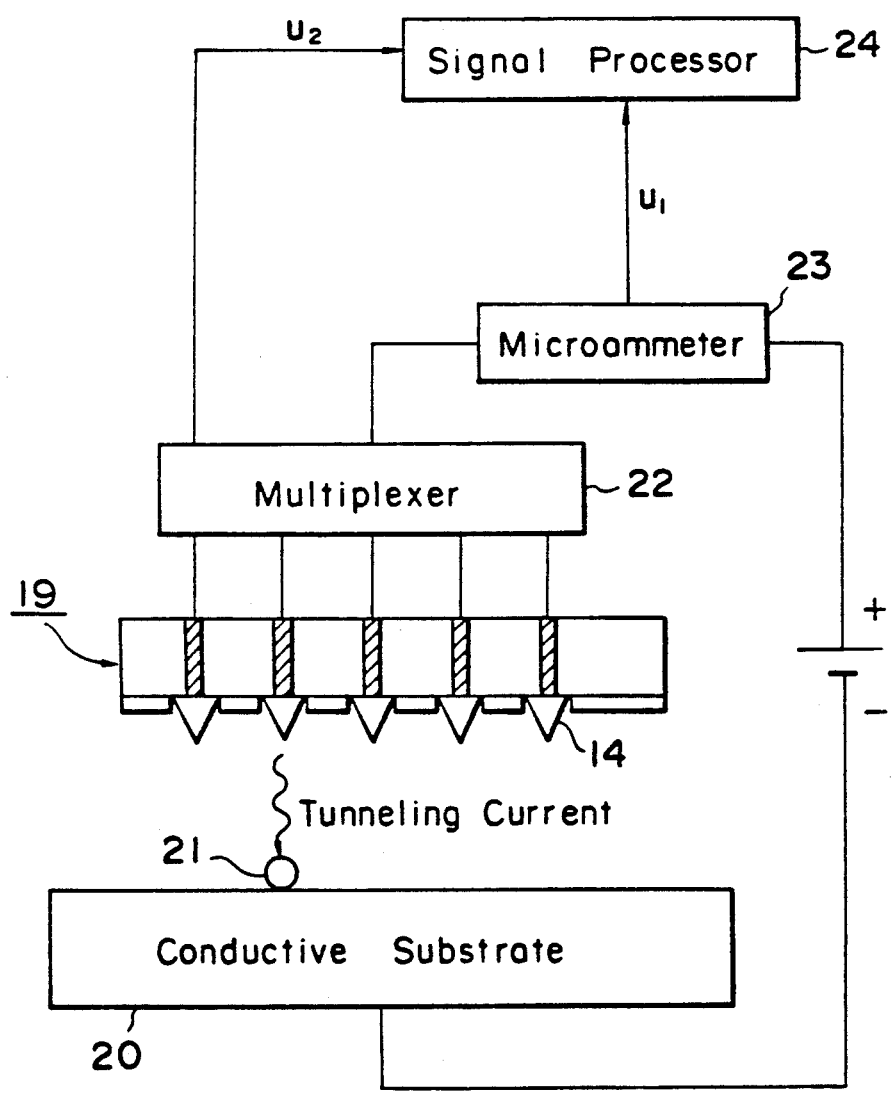
FIG. 4 is a measuring apparatus utilizing a microscopic multiprobe of this invention.

FIG. 4 shows such example of a microscopic multiprobe 19 used in measuring two-dimensional behaviors of a conductive particle 21 on a flat surface of a conductive substrate 20.

Firstly, the tips of the microscopic multiprobe 19 are set at a distance of about several nm (nano-meter) from the surface of the conductive substrate 20. Secondly, the connection for the microscopic probes 14 connected with a micro-ammeter 23 is switched to a fast scanning mode by means of a multiplexer 22. In this case a DC voltage of about several Volts is applied across the conductive substrate 20 and the microscopic probe 14 connected with the micro-ammeter 23 with the microscopic probes 14 impressed to positive polarity. A conductive particle 21 under a certain microscopic probe may be detected by measuring the tunnelling current through the microscopic probe. The current is measured by the micro-ammeter 23 and the measured value u1 is output to a signal processor 24. At the same time, the position u2 of the microscopic probe 14 connected with the micro-ammeter 23 is output from the multiplexer 22 to the signal processor 24. From the signals u1 and u2 the signal processor 24 may determine the position of the conductive particle 21. In this manner, by use of the microscopic multiprobe 19 the position of the conductive particle 21 may be promptly and accurately determined, in contrast to a conventional means having only one microscopic probe operable only mechanically over a conductive substrate 20 and thus hard to determine the position of a conductive particle 21.

The invention is now described below regarding the utilization of the microscopic multiprobe employed as the electron emission tips for lithography.

As reported in J. Vac. Sci. Technol. B4(1), 1986, pp 86-88 by M. A. McCord and R. F. W. Peace, it is possible to have a line with its width less than 0.1 $\mu$m formed on a substrate by means of a tunnelling current or an electric field emission current. In said paper, however, a single probe is used as an electron emission tip. Using the microscopic multiprobe of this invention as the electron emission tips, it is thus possible to simultaneously and effectively form a multiplicity of identical patterns.

Since in the case of multiline lithography it is not necessary to switch each of microscopic probes 14, as is necessary in detecting a conductive particle 21, the microscopic multiprobe electrical connection for this purpose may be fabricated simultaneously when the probe is formed. This implies that electrical wiring is not necessary after the formation of the microscopic probes 14. Namely, instead of the insulating silicon substrate shown in FIG. 2, an n-type silicon substrate doped with arsenic is used in forming the microscopic multiprobe, and $AsH_3$ is used instead of $B_2H_6$ gas for selective epitaxial growth of the probes. The polarity of the battery in FIG. 4 is also reversed. The rest of the procedures are the same as described in connection with FIG. 2. This permits the formation of n-type probes doped with As. Thus, the invention makes it possible to easily form densely populated conductive microscopic probes on a conductive substrate.

Although the invention is described above for a case in which square holes 13 are formed in the silicon oxide film 12, the holes may be of any other shape, insofar as they are all the same shape.

According to the invention a microscopic multiprobe having a high density of microscopic probes in arbitrary arrangement may be fabricated by this lithographical micro-fabrication technique. Furthermore, since the probes are formed by epitaxial growth, microscopic crystalline probes having sharp apices may be easily obtained.

I claim:

1. A method for making a microscopic multiprobe comprising the steps of:
    forming a thin insulating film on a crystalline substrate;
    forming a plurality of densely populated square holes in said thin film;
    selectively and epitaxially growing conductive crystals on said substrate exposed in said holes,
    to thereby form densely populated microscopic probes each having sharp apices on said crystalline substrate; and
    providing electrical contacts for each of said apices of said densely populated microscopic probes having through holes extending from the back of said crystalline substrate.

2. The method in accordance with claim 1 wherein said crystalline substrate is silicon.

3. A method for making a microscopic multiprobe comprising the steps of:
    forming a thin insulating film on a crystalline substrate;
    forming a multiplicity of densely populated holes in said thin film;
    selectively and epitaxially growing conductive crystals on said substrate exposed in said holes, to thereby form densely populated microscopic probes, each having sharp apices on said crystalline substrate;
    forming on the backside of said crystalline substrate contact holes reaching respective microscopic probes,
    implanting a metal material in each of said contact holes; and
    providing conductors to be connected with said metal material, but insulated from the rest, and extended out of the contact holes for connection with terminals.

4. The method in accordance with claim 3 wherein said predetermined shape of said holes is square.

5. A method for making microscopic multiprobes comprising the steps of:
    forming a thin insulating film on a crystalline substrate;
    forming a plurality of densely populated square holes in said thin film; and
    selectively and epitaxially growing conductive crystals on said substrate exposed in said holes,
    to thereby form densely populated microscopic probes each having sharp apices on said crystalline substrate;
    wherein said step of selectively and epitaxially growing said conductive crystals comprises exposing said substrate in said holes to the gases $SiH_2CO_2, HCl, H_2, B_2H_6$.

* * * * *